(12) United States Patent
Macbeth

(10) Patent No.: US 6,188,214 B1
(45) Date of Patent: Feb. 13, 2001

(54) PHASE CONTROL SWITCH WITH REDUCED HEAT DISSIPATING RFI INDUCTOR

(75) Inventor: Bruce F. Macbeth, Syracuse, NY (US)

(73) Assignee: Pass & Seymour, Inc., Syracuse, NY (US)

(*) Notice: Under 35 U.S.C. 154(b), the term of this patent shall be extended for 0 days.

(21) Appl. No.: 09/506,710

(22) Filed: Feb. 18, 2000

(51) Int. Cl.⁷ ........................................................ G05F 5/00
(52) U.S. Cl. ............................ 323/300; 323/320; 315/194
(58) Field of Search .................................. 323/300, 217, 323/320; 327/455, 476; 315/DIG. 4, 194

(56) References Cited

U.S. PATENT DOCUMENTS

| 3,484,623 | * | 12/1969 | Cain ........................................ 327/456 |
| 3,919,656 | * | 11/1975 | Sokal et al. ............................. 330/51 |
| 4,538,092 | | 8/1985 | Goralnik . |
| 4,876,498 | * | 10/1989 | Luchaco et al. ....................... 323/300 |
| 4,914,327 | * | 4/1990 | Dekker .................................. 323/324 |
| 4,954,768 | * | 9/1990 | Luchaco et al. ....................... 323/300 |
| 4,965,509 | * | 10/1990 | Oldham ................................. 323/300 |
| 5,179,324 | | 1/1993 | Audbert . |
| 5,319,301 | | 6/1994 | Callahan et al. . |
| 5,550,440 | | 8/1996 | Allison et al. . |
| 5,629,607 | | 5/1997 | Callahan et al. . |

* cited by examiner

*Primary Examiner*—Shawn Riley
(74) *Attorney, Agent, or Firm*—Wall Marjama & Bilinski

(57) ABSTRACT

A phase control switch with an RFI suppression inductor includes a first winding on the inductor in series with a triac. A first capacitor is in parallel across the series combination of the first winding and triac. The switch further includes a second winding on the inductor with a second capacitor connected in parallel across the second winding. When the second capacitor and second winding resonate, a Q rise in flux occurs in the inductor core, intercepting the flux in the first winding to produce a greater voltage drop across the first winding and a corresponding decrease in the rate of current rise in the triac. Fewer turns are needed in the first winding for proper RFI suppression, resulting in a smaller device.

14 Claims, 3 Drawing Sheets

PHASE CONTROL SWITCH WITH REDUCED HEAT DISSIPATING RFI INDUCTOR

FIELD OF THE INVENTION

This invention relates generally to an AC phase control switches used in lamp dimmers, and fan controls, and the like, and more particularly to an RFI inductor which can perform RFI filtering in a small, low heat dissipating package.

BACKGROUND OF THE INVENTION

The need for RFI suppression in phase controlled switches is well known in the prior art of phase control. Phase control switches with good RFI filtering tend to have bulky inductors in order to reduce heat dissipation and maintain adequate inductance. Phase controllers produce RFI frequencies during the step rise in current when the phase control switch is first activated. Typically an inductor is placed in series with the switch and a first capacitor is placed across the series combination. When the phase switch conducts, the inductor and capacitor form a resonant tank filter which has a break frequency which suppresses the RFI frequencies below a level which can cause interference with the AM broadcast band. This is well known in the prior art. A problem arises with attaining the maximum power control in the smallest package. When the phase controller is conducting and the load active, heat is dissipated by a first order phase switch voltage drop, and by a second order RFI inductor voltage drop. The RFI inductor must have many turns for the required inductance, and be of a large wire diameter to limit $I^2R$ loss in the inductor.

SUMMARY OF THE INVENTION

This invention reduces the $I^2R$ loss of a first inductor by reducing the number of winding turns carrying load current, and compensating for the loss of inductance by adding a second winding of small diameter wire on the first inductor core which resonates with a second filter capacitor. The second winding resonant circuit is chosen to resonate at a frequency point below the AM band, which at switch conduction resonates and causes a Q rise in flux in the second winding and shared inductor core. This produces a larger effective inductance in the load carrying inductor, which acts to limit the rate of rise of step current and the RFI frequencies generated. The bandwidth of the second winding resonant circuit is selected to be wide enough to start the RFI rejection below the AM broadcast band and extend to the resonant break frequency formed by the first filter capacitor and the load carrying inductor. In this way the heat dissipated by the inductor is much less and therefor the inductor can be of a smaller physical size.

This invention demonstrates a method to reduce the size of the inductor without sacrificing RFI suppression, allowing a smaller overall size of phase controller than the prior art.

DETAILED DESCRIPTION OF THE PRIOR ART

RFI Inductors used in phase controllers are typically large and bulky in respect to the package size of a controller, such as a light dimmer, for adequate suppression of RFI frequencies in the AM band. Much of the bulk comes from the wire diameter size, and number of turns required to limit the $I^2R$ heating from the inductor during the conduction period of the load. It is desired to have the smallest overall device size for a phase controller such as a dimmer. Heat dissipated inside the device limits the overall smallest size. An inductor with few turns of wire is desirable for a smaller inductor size, and less $I^2R$ loss, allowing a smaller overall phase controller package. In a conventional RFI filter such as shown in FIG. 1, reducing the turns on a given core 4 reduces the inductance to a value which will not sufficiently act as an RFI suppressor. FIG. 1 is a typical circuit with a choke or inductor 2 having a winding 6 on a core 4. The inductor 2 is connected in series with a phase control switch, such as a triac 8, with a first filter capacitor 12 connected across the series combination of inductor 2 and triac 8. The junction of inductor 2 and capacitor 12 connects to the hot power line 16. The junction of triac 8 and capacitor 12 is connected to the load 10, and the triac gate 9 is connected to a phase trigger control circuit 7. FIG. 2 shows the time waveform 21 for the step in current to the load, while waveform 22 shows the frequency spectrum response for the step in load current. When the triac 8 switches into conduction, inductor 2 slows the steep rise in current shown at 20 in FIG. 2, suppressing the bandwidth of frequencies generated by the step in current. Further filtering occurs at the break frequency formed by capacitor 12 resonating with inductor 2 generally shown at point 24 on frequency response 22. For comparison purposes, the inductor 2, which together with capacitor 12, determines the frequency response 22, has few turns 6 of large diameter wire and is of a small physical size with reduced $I^2R$ loss. The break frequency formed by capacitor 12 resonating with inductor 2, is shown generally at 24. Note that the response 22 is not suppressed below the desired suppression level 28 in the lower AM broadcast band 26, from 550 kHz to about 600 kHz. Normally a much larger inductor with many more heat dissipating turns would be used to lower the break frequency below the AM band to avoid AM interference.

This invention describes a method which allows reduction of winding turns on the inductor, while lowering $I^2R$ loss, without sacrificing RFI suppression.

DESCRIPTION OF THE PREFERRED EMBODIMENT

Figure 2:
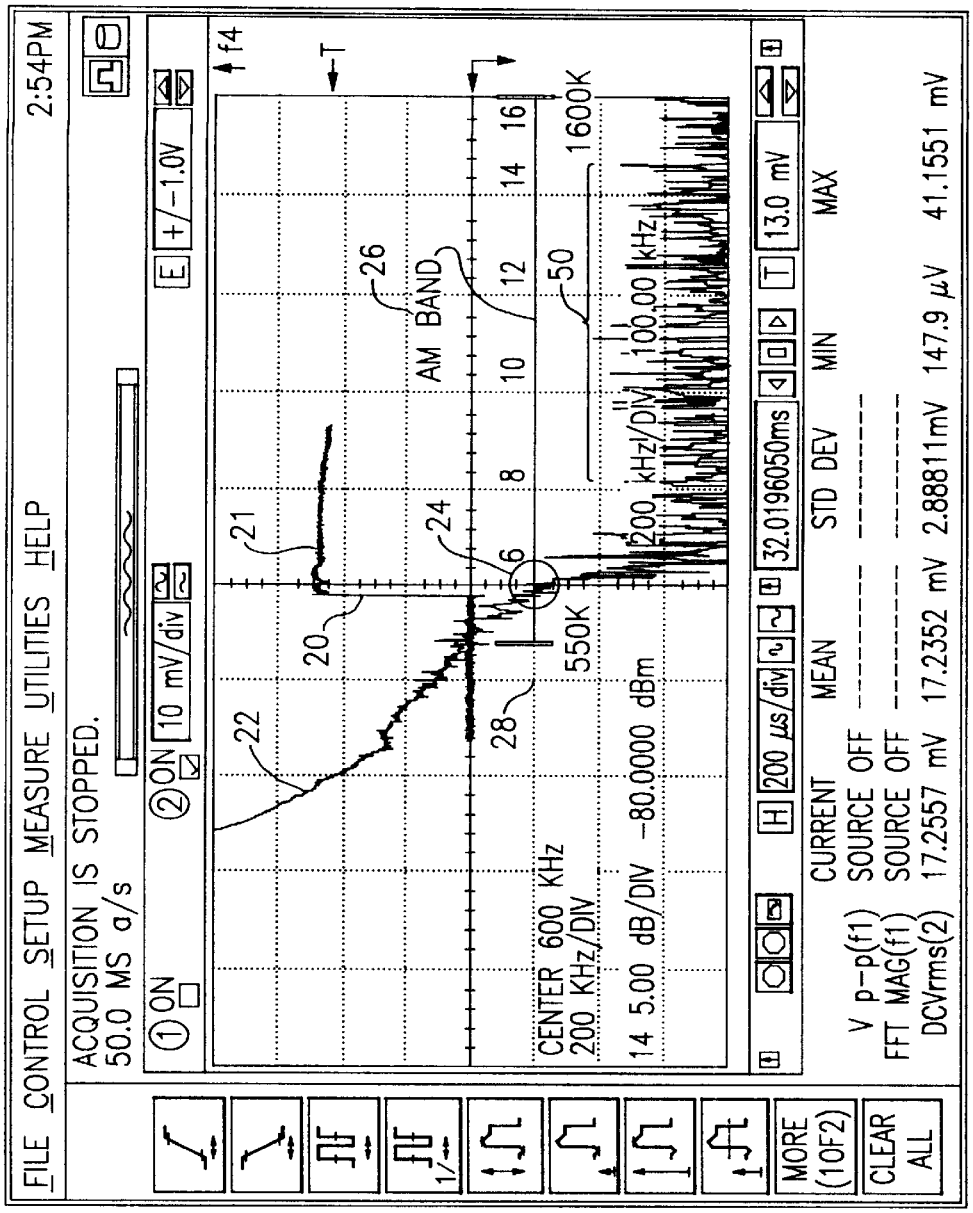
FIG. 2 shows the frequency and time response of the circuit of FIG. 1 during the di/dt step in current at phase control activation.
Figure 4:
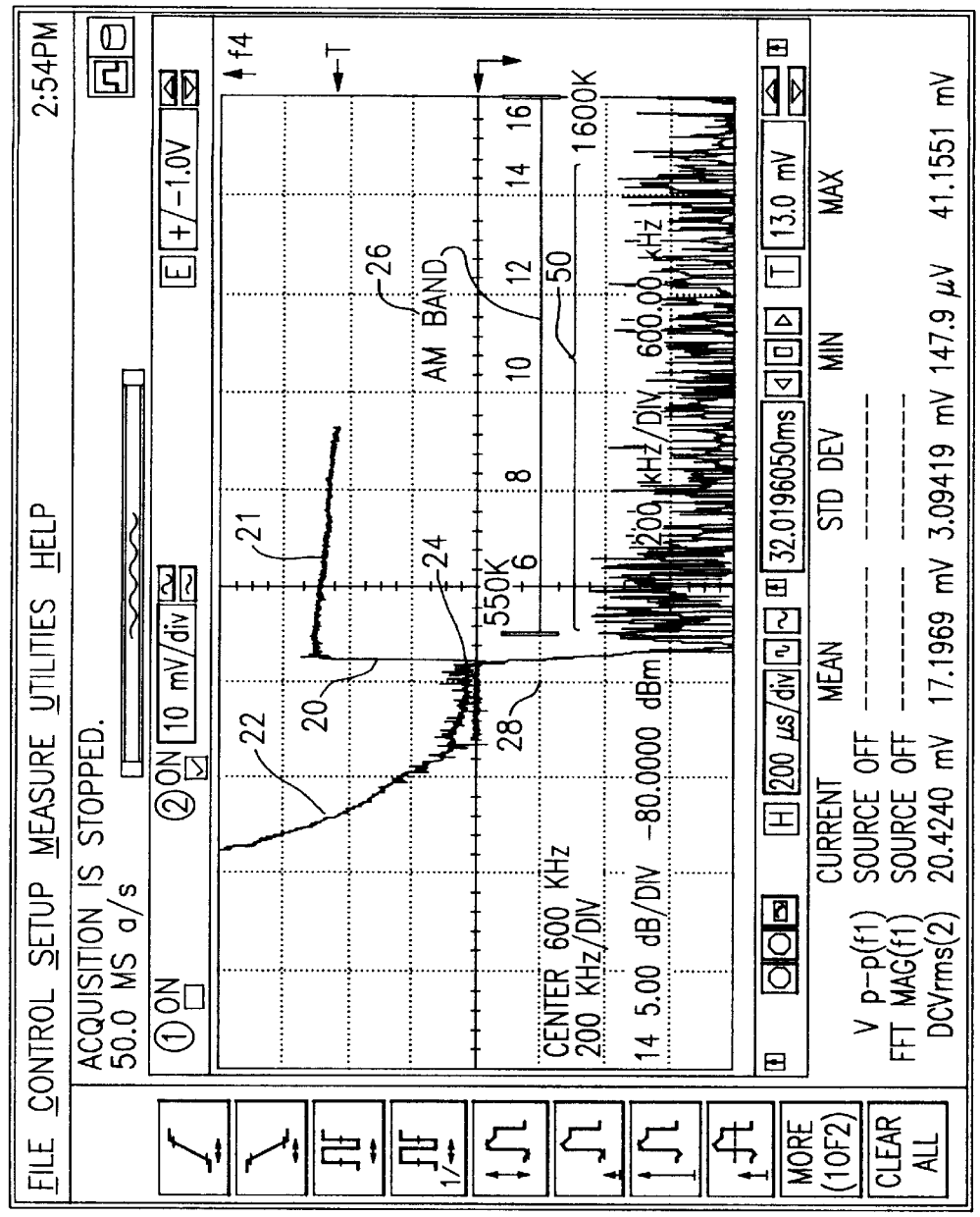
FIG. 4 shows the frequency and time response of the circuit of FIG. 3 at the di/dt step in current.
Figure 3:
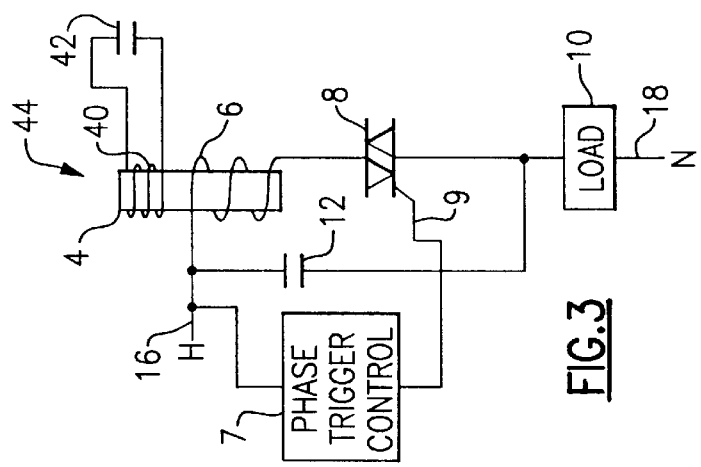
FIG. 3 is a schematic diagram of a preferred embodiment of an RFI inductor in accordance with this invention, with a second resonant circuit.

FIG. 3 shows a preferred embodiment of this invention. Throughout the figures, like elements are designated with like reference numbers. The circuit is similar in some respects to the circuit shown in FIG. 1 with like connections to the power line 16, load 10, and phase trigger control 7. An inductor 44 has the same core 4, and first winding 6 as the inductor 6 shown in FIG. 1, but has an additional second winding 40 constructed of small diameter wire wound on core 4 and has a capacitor 42 connected in parallel therewith, forming a parallel resonant circuit. The resonant frequency of the second resonant circuit formed by capacitor 42 and winding 40 is selected to lie just below the AM broadcast band. The Q of the circuit is selected so that the circuit has a bandwidth that extends to the break frequency caused by winding 6 resonating with capacitor 12. In this way, when the second tank resonates, a Q rise in flux occurs in core 4, which intercepts winding 6 producing a greater voltage drop across winding 6 and a corresponding decrease in the di/dt rate of rise in triac 8 current at conduction. As with FIG. 2, FIG. 4 shows load current waveform 21 with triac 8 conduction step 20 with the corresponding load current spectrum response 22. This action of the second tank resonance pulls the spectrum frequency response 22 low as shown in FIG. 4, generally at 24, which is below the start of the AM band, and much below the break frequency point 24 shown in FIG. 2 for the same inductor winding 6, and also below the desired suppression reference line 28. The resonance of the first tank formed by winding 6 and capacitor 12 acts to keep spectrum 22 low as is shown in FIG. 2 as spectrum band 50. Winding 40 carries only signal current and dissipates little heat. Capacitor 42 is not subjected to the line voltage and can be of a small physical size. This allows a lower heat dissipating inductor to be constructed of a small size, which allows a smaller corresponding total phase control switch size which until now has not been possible while still meeting heat rise requirements of the total package.

Figure 1:
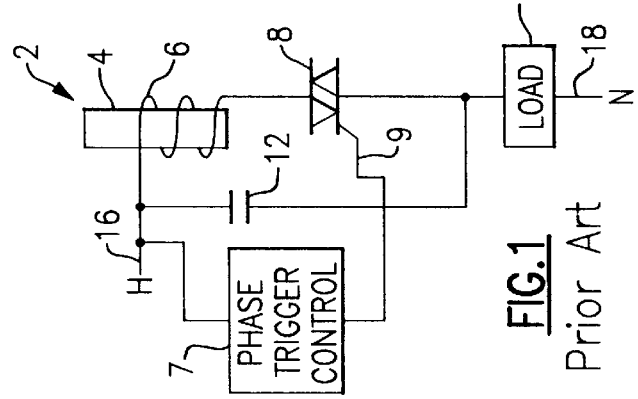
FIG. 1 is a schematic diagram of a phase control circuit having an inductor included in a phase control RFI filter, in accordance with the prior art.
Figure 5:
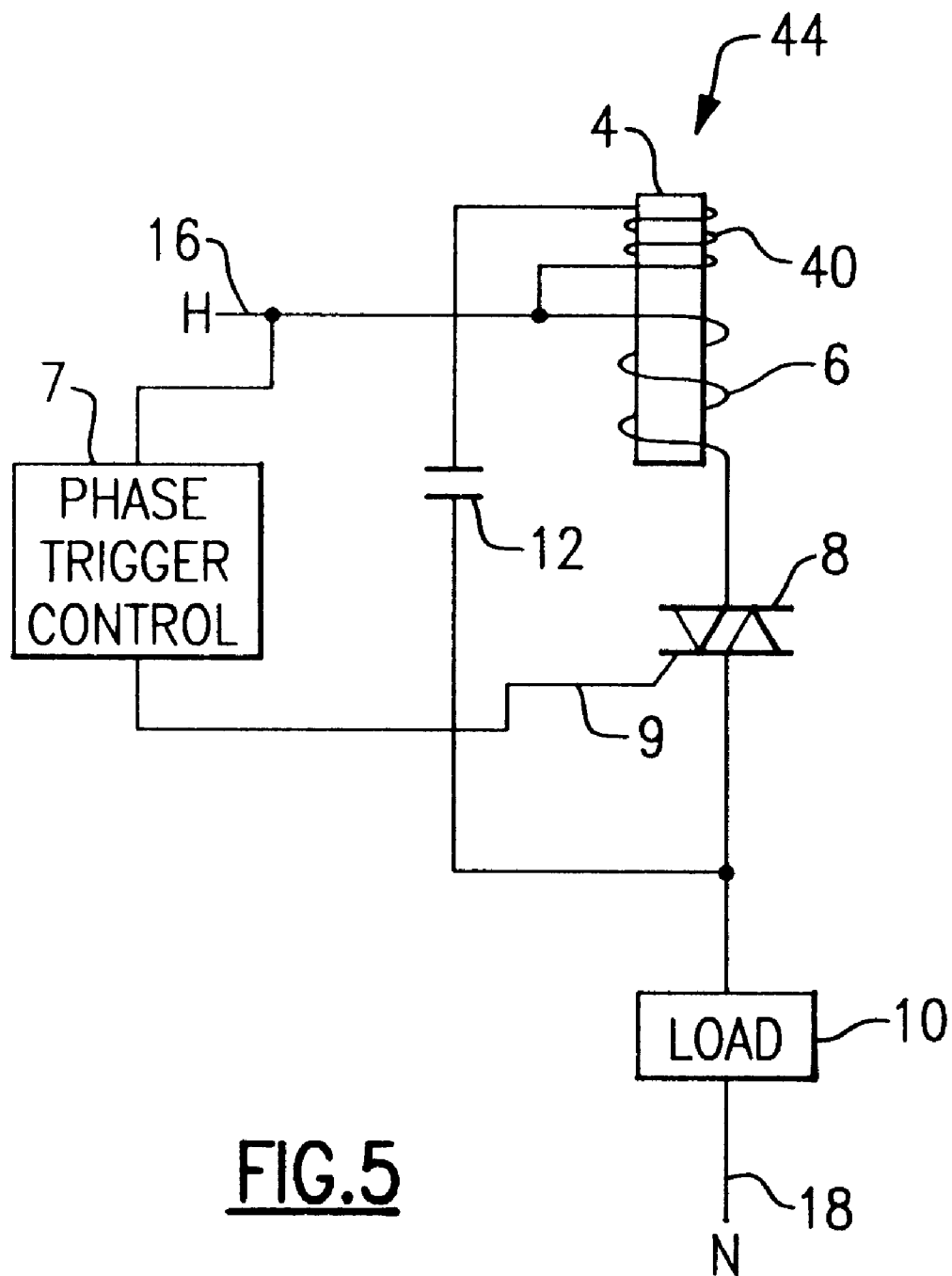
FIG. 5 is a schematic diagram of a phase control circuit in accordance with another embodiment of the invention.

FIG. 5 is an alternate construction, similar in some respects to the circuits shown in FIGS. 1 and 3, and having the same line 16, load 10, and phase trigger7 connections. FIG. 5 shows an inductor 44 with small diameter winding wire 40, which does not carry load current, connected in series with winding 6, wound of large diameter, low heat dissipating wire. When the triac 8 switches into conduction, a resonant tank is formed by capacitor 12 resonating with the inductance formed by the winding 40 in series with winding 6, which gives a lower resonant frequency than capacitor 12 acting with the inductance of winding 6 alone. Winding 40 does not carry load current and can be wound with a small diameter wire. This lower resonance causes a Q rise in flux in core 4, which acts to produce back EMF voltage across winding 6. This suppresses the di/dt rate of rise of switch conduction current, causing a suppression of RFI at lower frequencies of noise components. In this way, as above, an inductor can be constructed with fewer turns of load carrying wire with a corresponding decrease in $I^2R$ loss.

It will be understood by those skilled in the art that although a bar core is shown for the RFI inductors, a toroid core could also be used with the same principles producing a smaller size and less $I^2R$ loss.

While the invention has been described with reference to several preferred embodiments thereof, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A phase control switch, with an RFI suppression inductor, including:
    an electronic switch;
    an inductor having a first winding connected in series with the electronic switch and a second winding;
    a first capacitor connected in parallel across the electronic switch and first winding;
    and
    a second capacitor connected in parallel with the second winding.

2. The phase control switch of claim 1 in which the electronic switch comprises a semiconductor device.

3. The phase control switch of claim 2 in which the semiconductor device comprises a triac.

4. The phase control switch of claim 2 in which the semiconductor device comprises an SCR.

5. The phase control switch of claim 1 in which the second capacitor and the second winding form a resonant circuit having a resonant frequency below the AM broadcast band.

6. The phase control switch of claim 5 in which the resonant circuit has a Q such that the circuit has a 3 dB bandwidth that overlaps the lower end of the AM broadcast band.

7. The phase control switch of claim 2 in which the semiconductor device comprises a FET.

8. The phase control switch of claim 1 in which the inductor comprises a bar core.

9. The phase control switch of claim 1 in which the inductor comprises a toroid core.

10. The phase control switch of claim 1 in which the inductor comprises a ferrite core.

11. A phase control switch comprising:
    an electronic switch connected between an ac power source and a load;
    an inductor having a first winding connected in series between an ac power source and the electronic switch and a second winding connected in series with the first winding; and
    a first capacitor connected in parallel across the electronic switch and the first and second windings.

12. The phase control switch of claim 11 in which the inductor comprises a bar core.

13. The phase control switch of claim 11 in which the inductor comprises a toroid core.

14. The phase control switch of claim 11 in which the inductor comprises a ferrite core.

* * * * *